Jan. 14, 1969  E. V. BISHOP  3,421,645
POWER LOADING AND UNLOADING TRUCK BODY
Filed June 30, 1966  Sheet _1_ of 3
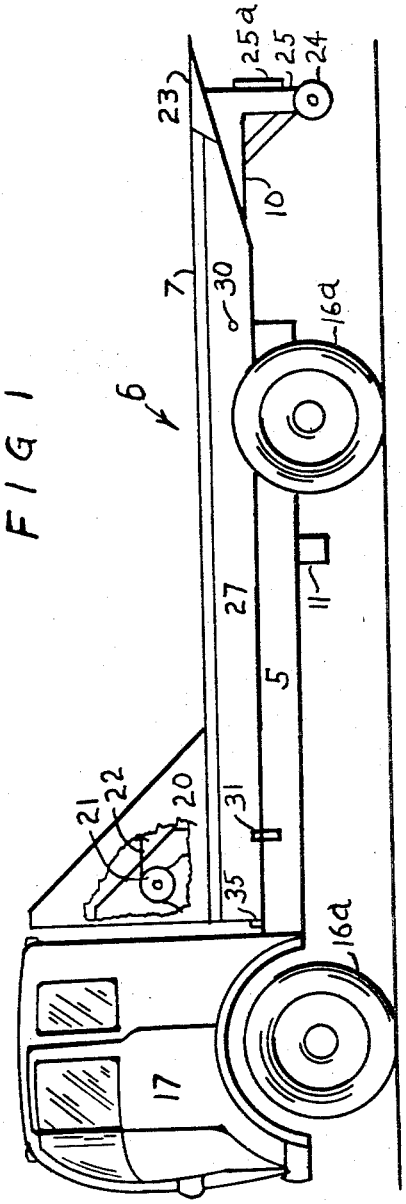
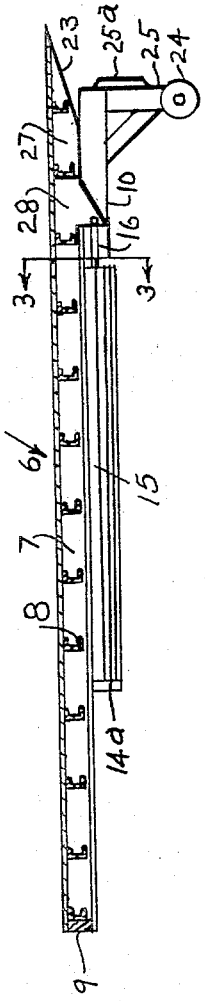
EDWIN V. BISHOP INVENTOR.
BY Shepherd & Campbell

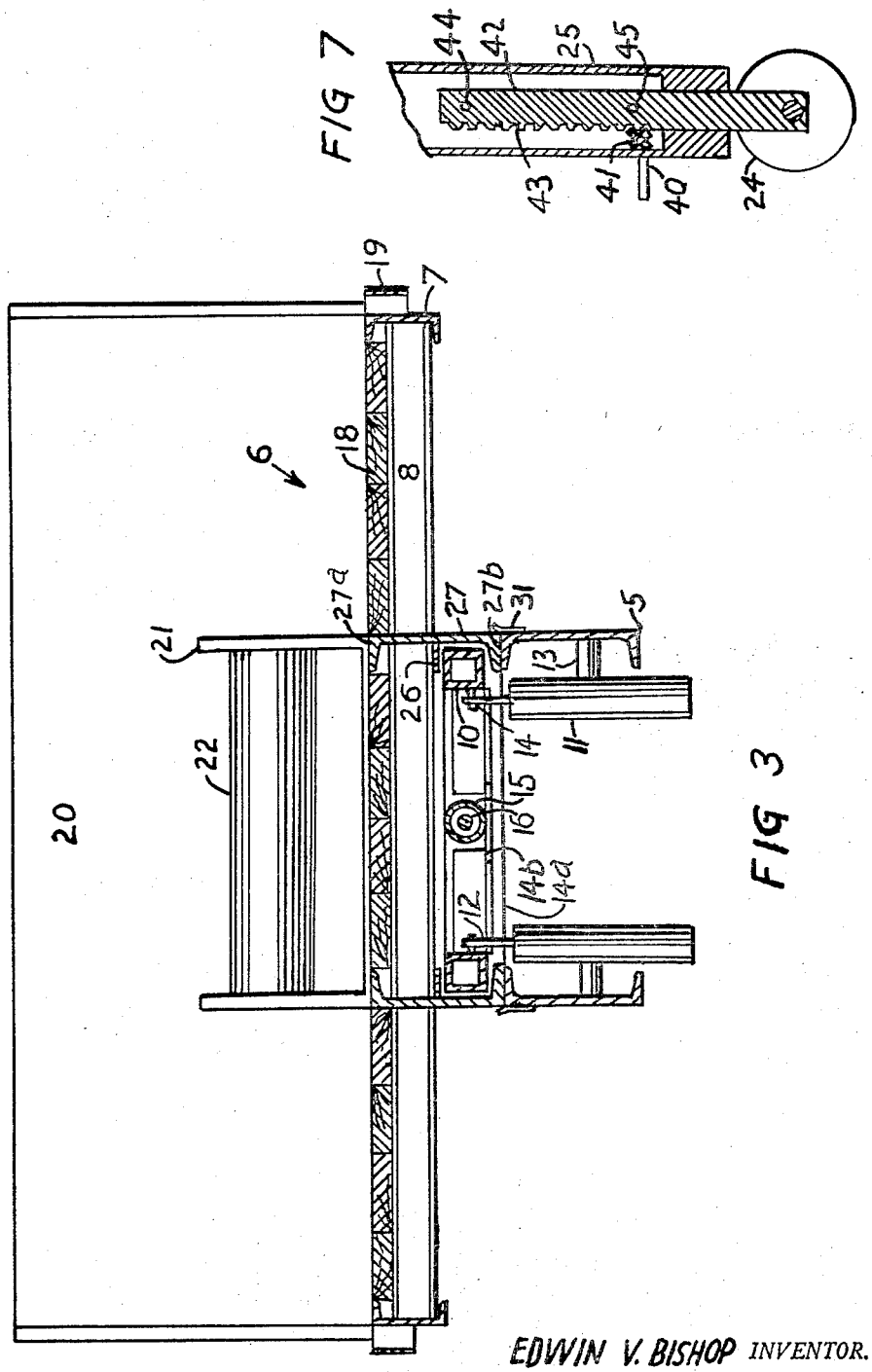

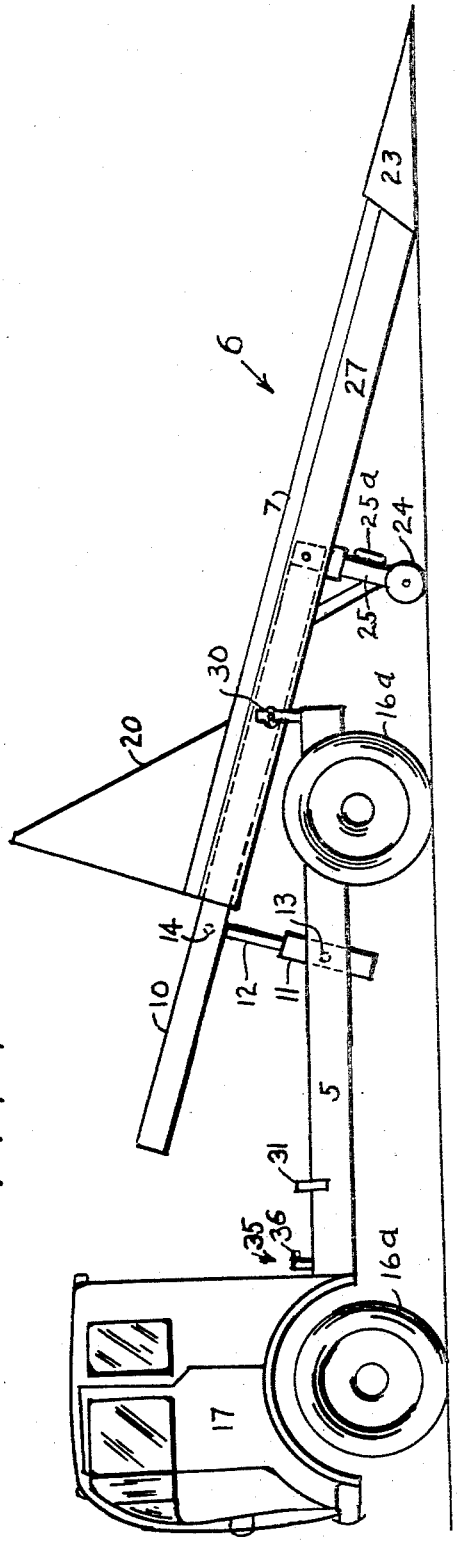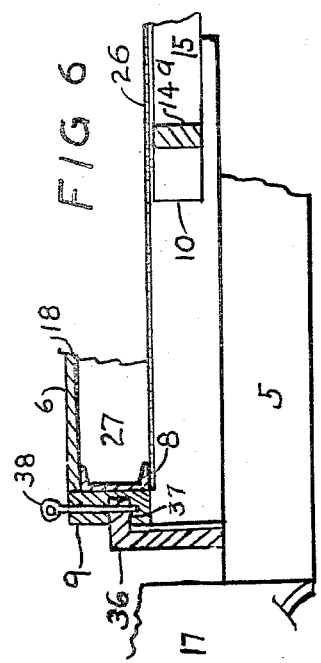

United States Patent Office 3,421,645
Patented Jan. 14, 1969

3,421,645
POWER LOADING AND UNLOADING
TRUCK BODY
Edwin V. Bishop, Sparks, Md.
(4537 28th Ave. N., St. Petersburg, Fla. 33713)
Filed June 30, 1966, Ser. No. 561,772
U.S. Cl. 214—505      3 Claims
Int. Cl. B60p 1/04

ABSTRACT OF THE DISCLOSURE

This invention relates to truck bodies of the general character of that shown in U.S. patent to Klosek, et al. It is distinguished over Klosek and any other prior art known to me in that it comprises a structure composed of a wheeled chassis, a power operated tilt frame pivoted to tilt upon the chassis, a stout, downwardly extending, wheeled support carried by the tilt frame at a point rearward of the rear wheels of the chassis, a bed mounted for sliding movement upon the tilt frame, and a power element for moving the sliding bed fore and aft upon the tilt frame.

All of the described parts make up a unitary structure, bodily movable with the chassis and the parts being so dimensioned and of such strength that the whole may be moved with the sliding bed projected to a position in which its sharp, metal shod rear end may be thrust under a heavy load by rearward movement of the chassis. A winch upon the sliding bed includes a cable which acts to draw a heavy load upon the sliding bed, when necessary. The capability of the structure to thus function in the extended position of FIG. 4 is effected by making the stout, downwardly extending support a wheeled one.

This wheeled support may be vertically adjusted to maintain maximum support for the load when variations of ground level between the rear wheels of the chassis and the ground engaging rear end of the sliding bed would leave the wheeled support out of contact with the ground if such adjustment were not provided.

---

The respects in which the truck body of this invention differs from any prior art structure will be best understood by reference to the accompanying drawings, in which:

FIG. 1 is a diagrammatic side view, partly in vertical section, of the truck of this invention;

FIG. 2 is a diagrammatic view, in longitudinal section, of the sliding bed and tilt frame of the body;

FIG. 3 is a diagrammatic transverse sectional view taken on line 3—3 of FIG. 2, with the ground wheels omitted;

FIG. 4 is a diagrammatic view of the whole truck structure, with the sliding bed projected to position for loading or unloading at ground level;

FIG. 5 is an enlarged fragmentary section of a heavy ground contacting shoe which constitutes the rear end of the sliding bed;

FIG. 6 is a detailed sectional view illustrating a locking means hereinafter described; and, FIG. 7 is a sectional view of means for extending the bed support wheels of the truck.

Like numerals designate corresponding parts in all of the figures of the drawings.

In the drawings, 5 designates the chassis of a conventional truck upon which a sliding bed 6 is mounted. This bed is made up of the outer side members 7 of channel formation, between which extend a plurality of transverse channel members 8, the ends of which are securely welded to the inner faces of the channels 7. A transverse head 9 is of a height to extend vertically across the inner ends of the channel members 7, and is also of a height to extend between and tie together the ends (FIG. 2) of the main sliding bed channel members 27.

The tilting movement of the tilt frame 10 is effected by means of conventional hydraulic cylinders 11 and piston rods 12. The cylinders are pivoted or trunnioned at 13 for oscillation upon the chassis, while the piston rods are pivotally connected at 14 to the tilt frame.

The sliding movement of the bed upon the tilt frame is effected by a long hydraulic cylinder 15 and piston rod 16. The piston rod is connected to the sliding bed by a mounting plate 28. A transverse head 14a and transverse brackets 14b serve to secure the cylinder 15 to the tilt frame. The chassis is supported by conventional ground wheels 16 and carries a conventional driver's cab 17.

The sliding bed is provided with a floor which is carried upon the tops of transverse channels 8. This floor may be made of metal or other suitable material. In FIG. 3 the floor is shown to consist of heavy wooden planks 18. The outer sides of the members 7 carry stake receiving sockets 19.

The head frame 20 is for the purpose of restraining cargo from hitting the cab. The side wings are for the purpose of restraining the head frame.

The winch 21 is mounted on the floor and the cable pull of cable 22 reacts against the main floor frames 27.

To render the structure long lived but of minimum functional resistance to the drawing of a load upon the sliding bed, the rear end of said bed is made to consist of a heavy steel shoe 23, and this shoe is shaped to rest upon the ground and to slide easily thereover. Thus the loading of a heavy object may be effected by the action of sliding the bed under the object and wedging it up rather than sliding the object along the surface upon which it rests to draw it onto the bed. To further assist, rollers may be introduced between the bed and the object, eliminating any sliding action of the object either on the ground or on the bed.

The ability of the slide bed to be forced under the load is brought about by the fact that the rigid support at the rear of the tilt frame is arranged to be able to roll on wheels or slide on a shoe along the ground rather than to be anchored in fixed position while supporting the load. Thus, the whole truck may be backed under a load rather than drawing the load onto the truck.

The mounting of the sliding bed upon the tilt frame includes plates 26 which project inwardly from the sides of longitudinal members 27 and are also supported by attachment to the bottoms of transverse members 8 which pass through the webs of longitudinal members 27 and are welded to the webs. The plates 26 bear against the upper faces of the tilt frame main members when the body is in tilted position, and in sliding the sliding takes place along this surface. These large bearing surfaces render use of rollers or wheels to effect sliding unnecessary, thus eliminating parts which are expensive to install and to maintain, and which weaken the structure by producing highly concentrated loads, and applying bending to the flanges of the supporting beams.

A most important feature of the invention resides in the provision of channel members 27 of such great depth as to have their upper flanges 27a substantially level with the top of the floor 18 of the slide bed, while the lower flanges 27b are inturned and ride beneath the side rails of the tilt frame and directly upon the truck chassis 5.

It has been found that in supporting heavy loads the main floor longitudinals give evidence of failure due to lack of depth when the body is in tilted position and the main floor longitudinals are not supported and resting upon the truck chassis rails. The described construction provides assurance against such bending to a greater extent than has been the case in any prior art device of which I have knowledge.

It is highly desirable to keep at a minimum the height of the deck above the ground.

The main fore and aft members 27 of the sliding bed thereby become as deep as the geometry permits, and are very securely braced by attachment to the cross sills. In addition, it is to be noted that the top flanges of the main fore and aft members become very rugged skid strips 27a protecting the main body of the floor. It is also to be noted that the upper flanges, while acting as skid strips, reduce the necessary area of flooring, thus making a very desirable reduction in cost and weight.

The added strength is evident from the fact that a 7" channel weighing 22.7 lb. per ft. has a section modulus of only 13.5, while a 12" channel producing the same bed height with sills running through rather than on top weighs only 20.7 lb. per ft. and has a section modulus of 21.4. It is, therefore, about five percent lighter and about 58 percent stronger.

The strength of the main fore and aft members is very important in this type of body because of the nature of its motions and use. When the tilt frame is fully extended rearwardly, and tilted to touch the ground, any further tilting action will cause the truck to rest only on the front wheels and the extreme rear of the tilt frame. This is likely to occur if the body is on uneven ground and the front wheels or extreme rear or both happen to be on high spots. It is possible in this case to pick up the rear wheels of the truck and the rigid support as well. At this time the main fore and aft members are subjected to very heavy bending stresses, particularly if the truck is heavily laden.

The main cargo weight is ordinarily carried by the flooring which rests upon the cross sills or channels 8. The sills transmit the load to the main fore and aft members which in road travel configuration rest on top of the truck chassis frame members. When the body is tilted, the lifting is done by the lift cylinders 11 lifting the tilt frame, which in turn lifts the main longitudinal channel members 27. In previous designs, the load was transmitted from like members through wheels bearing against the top flanges of said members. This causes a highly concentrated load, and has the effect of bending the top flanges in relation to the web. In my improved design, the load is transmitted from the tilt frame to long side strips 26 which are welded to the bottoms of the cross sills, and also to the main fore and aft channels. Also, the load is spread out over a long length of slide instead of being concentrated at a point. Because the load is applied to the bottoms of the sills, there is no bending whatsoever in the flanges or webs of the main fore and aft members by virtue of the method of application of the load. The spreading out of the load being transferred from the tilt frame to the fore and aft members also nullifies the necessity for wheels or rollers, as a simple metal-to-metal lubricated slide has been demonstrated to be very satisfactory. The slide is stronger, more durable, and less expensive than wheels, rollers or other devices for the purpose.

When the body is extended rearwardly any appreciable distance, a support is required behind the rear wheels to support some of the load and to achieve stability. Rear support 25 is provided for this purpose. At its lower end rear support 25 is provided with wheel 24, so that it may move along the ground while carrying the load. A sliding shoe might be substituted for the wheel. In order that the wheel might touch the ground when the body is tilted, and be clear of the ground when the body is level, the rear support is attached to the tilt frame. It is desirable at times to move the sliding bed rearwardly without tilting or fully tilting the body. To accomplish this the rear support may be made adjustable vertically, and in this respect it is similar in action to the landing gear of a conventional semi-trailer.

The rear support wheels 24 and rear shoe 23 permit the bed to be forced under a load wedge fashion when the bed is in loading configuration, by virtue of the ability of the whole truck to move rearwardly while the rear support is under load. With the ability to adjust the rear support vertically this is also possible whether the bed is fully tilted, level or intermediate between the two.

The landing gears 24 and 25 are extendable to give support to the sliding bed on any type of ground surface. This feature also allows the sliding bed to be moved straight back without tilting the frame if the ground or some other obstruction makes it impossible to back the truck into a difficult position.

The extension of the landing gear is brought about by turning hand crank 40. Hand crank 40 turns gear 41 which engages notched edge 43 of the wheel carrying shaft 42, and moves the wheel carrying shaft 42 and wheel 24 to the "down" position. Holes 44 and 45 are provided in the wheel carrying shaft, through which a pin may be placed to lock the wheels in either the "up" or "down" position.

The tilt frame is pivoted from the rear of the truck chassis 5 on pivots 30.

The rear support frame is provided with an extension 25a which serves as a bumper.

The fluid supply to the hydraulic system, being conventional, is not shown. A fluid supply tank, a power take-off from the truck chassis, a pump for maintaining pressure, piping and fittings to transfer the fluid, valves for directing the fluid, hydraulic cylinders, and a hydraulic motor to actuate the winch comprise the essentials of the hydraulic system.

To secure the sliding bed from accidentally sliding when in transport configuration, or the tilt frame from tilting, a locking device is provided, as shown in FIG. 6. This lock consists of a member of inverted L-shape 36 extending upwardly from the truck chassis. When the body is horizontal and the slide frame is all of the way forward the member 36 projects through a slot 37 in transverse member 9. A locking pin 38 is inserted through openings in 9 and 36, to prevent the body from sliding relative to the chassis. Inverted L-shape member 36 also prevents the body from tilting without first moving rearwardly sufficiently for member 36 to be clear of member 9.

Guide plates 31 are attached to the chassis to accurately guide the slide frame into proper place, and to prevent any side motion of the slide frame relative to the chassis while in transit.

It is understood that the invention is not limited to the precise construction set forth, but that it includes within its purview whatever changes fairly fall within either the terms or spirit of the appended claims.

Having thus described my invention, I claim:

1. In apparatus of the character described, a wheeled chassis frame, a tilt frame, and a bed mounted to slide with respect to the tilt frame, said tilt frame comprising stout longitudinally extending side members and the bed being made up of a floor, a plurality of transverse beams upon which the floor is supported and a pair of spaced main beams through which said transverse beams pass and to which said transverse beams are securely fastened, elongated plates carried by the main beams which rest upon said stout side members of the tilt frame, said main beams of the bed having inturned flanges at the tops and bottoms thereof, said main beams being of such vertical width that the top of the upper flange thereof lies substantially flush with the upper face of the floor while the lower flange thereof extends inwardly beneath the side members of the tilt frame and bears upon the chassis frame when in use.

2. A structure as recited in claim 1 in combination with a stout, vertically adjustable wheeled support carried by the tilt frame at a point rearwardly of the rear wheels of the chassis.

3. Apparatus of the character described comprising a wheeled truck chassis, a tilt frame pivoted to tilt upon the truck frame, a load receiving sliding bed upon the tilt frame, separate power elements for tilting the tilt frame and for imparting sliding movement to the sliding bed to forcibly project said bed rearwardly, a ground engaging, sharp metal shod rear end secured to the sliding bed, a stout and rigid support mounted on and beneath the tilt frame at a point rearwardly of the rear wheels of the truck chassis, and a vertically adjustable ground engaging wheeled mounting upon the lower end of said support, whereby to permit the sharp rear end of the sliding bed to be thrust beneath a load by bodily rearward movement of the whole when the truck is moved rearwardly.

References Cited

UNITED STATES PATENTS

| | | | |
|---|---|---|---|
| 2,065,833 | 12/1936 | Stratton et al. | 214—505 |
| 2,550,230 | 4/1951 | Dalton | 214—505 |
| 2,621,814 | 12/1952 | Lisota | 214—505 |
| 2,745,566 | 5/1956 | Bouffard | 214—505 |
| 2,823,817 | 2/1958 | Holsclaw | 214—506 |
| 1,628,871 | 5/1927 | Bruce | 214—83 |

ALBERT J. MAKAY, *Primary Examiner.*